United States Patent
Delnick

(10) Patent No.: US 8,460,823 B1
(45) Date of Patent: Jun. 11, 2013

(54) ELECTROCHEMICAL COMPONENTS EMPLOYING POLYSILOXANE-DERIVED BINDERS

(75) Inventor: Frank M. Delnick, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 429 days.

(21) Appl. No.: 12/973,342

(22) Filed: Dec. 20, 2010

Related U.S. Application Data

(60) Provisional application No. 61/288,561, filed on Dec. 21, 2009.

(51) Int. Cl.
*H01M 4/02* (2006.01)
*H01M 4/13* (2010.01)
*H01M 4/60* (2006.01)

(52) U.S. Cl.
USPC .......................................... 429/212; 429/209

(58) Field of Classification Search
None
See application file for complete search history.

(56) References Cited

U.S. PATENT DOCUMENTS

| 5,552,466 A | 9/1996 | Beckley et al. |
| 2009/0191465 A1* | 7/2009 | Hwang et al. ................. 429/331 |

FOREIGN PATENT DOCUMENTS

JP 2001283922 A 10/2001

OTHER PUBLICATIONS

Masset, Thermal activated (thermal) battery technology Part II. Molten salt electrolytes, Journal of Power Sources 164, (2007), 397-414.
Andersson, Silicone Elastomers for Electronic Applications. I. Analyses of the Noncrosslinked Fractions, Journal of Applied Plymer Science, vol. 88, (2003) 2073-2081.

\* cited by examiner

*Primary Examiner* — Barbara Gilliam
*Assistant Examiner* — Jennifer Rea
(74) *Attorney, Agent, or Firm* — Carol I. Ashby

(57) ABSTRACT

A processed polysiloxane resin binder for use in electrochemical components and the method for fabricating components with the binder. The binder comprises processed polysiloxane resin that is partially oxidized and retains some of its methyl groups following partial oxidation. The binder is suitable for use in electrodes of various types, separators in electrochemical devices, primary lithium batteries, electrolytic capacitors, electrochemical capacitors, fuel cells and sensors.

24 Claims, 12 Drawing Sheets

ELECTROCHEMICAL COMPONENTS EMPLOYING POLYSILOXANE-DERIVED BINDERS

This patent application claims priority benefit from U.S. provisional patent application Ser. No. 61/288,561, filed on Dec. 21, 2009, which is incorporated herein by reference.

The United States Government has rights in this invention pursuant to Department of Energy Contract No. DE-AC04-94AL85000 with Sandia Corporation.

BACKGROUND OF THE INVENTION

This invention relates to electrode and separator components for batteries, electrolytic capacitors, electrochemical capacitors, fuel cells, and sensors and to methods of fabrication for the same.

One type of battery is the primary reserve thermal battery. Thermal batteries are a type of battery characterized by long shelf-life (>20 years) even under extreme environmental conditions. They exhibit high functional reliability even after prolonged storage and possess high pulse power capability. A typical thermal battery comprises an anode comprising an alkali alloy, such as a lithium alloy, or an alkaline earth metal, a salt electrolyte, a chromate or metal sulfide cathode, and a heat source that is usually positioned between cells. Cells are stacked in bipolar configuration and thermal insulation is positioned around the circumference and at both ends of the cell stack. The battery case is usually hermetically sealed. An energy impulse from some external source activates the heat source (often pyrotechnic materials) to melt the electrolyte. The battery then becomes ionically conductive and produces power for a short period of time, typically from a few seconds to an hour or so. A typical thermal battery operates over the temperature range of approximately 352 to 600° C.

The most common anode material is a lithium alloy such as Li(Si) or Li(Al), although calcium is also sometimes used. The electrolyte is typically a molten eutectic mix of lithium chloride and potassium chloride which has a melting point of 352° C. Some materials that can be used for cathodes include calcium chromate, potassium chromate, potassium dichromate, lead chromate, metal oxides, and metal sulfides. The Li(Si)/FeS$_2$ cell configuration has the advantages of operation under discharge conditions from open circuit to high current densities, tolerance to processing variation, and stability in extreme environments. Disadvantages of current designs of thermal batteries include low energy density, activated surface temperature of 230° C. or higher, and high cost.

The basic design and production methodology of thermal batteries was developed in the mid-1960s, and since then, there have been some changes in the anode, separator and cathode materials. However, the basic design and fabrication processes remain essentially the same, and the use of these processes yield batteries that are often drastically overbuilt yet not robust.

A conventional thermal battery consists of a stainless steel can which contains a bipolar stack of cells consisting of discrete elements, including the cathode pellets, anode pellets, electrolyte pellets, heating pellets, stainless-steel current collectors, grafoil current collectors; and thermal insulation. The pellet geometry (surface area and thickness) is dictated by the pressing processes used to fabricate the pellets. A minimum pellet thickness is required to achieve mechanical integrity, and this thickness is typically far greater than that required to meet the electrical requirements of the battery. Currently available thermal batteries often contain 5-fold to 40-fold excess of active ingredients, and therefore they operate at a Coulombic efficiency of only 2.5 to 20%. Additionally, the excess material in the pellet, which facilitates the mechanical integrity of the pellet, also increases the pellet resistance, and thereby reduces the output power. In addition to the problems of power loss and low Coulombic efficiency, the excess mass of pellet-based components must be heated and maintained at temperature, so additional weight and volume penalties result from the need for excess heat powder, excess insulation, and a larger/heavier stainless steel container. Thus, advances in thermal battery performance have been limited by continued use of the pellet processing technology originally developed in the 1960s. Very significant improvements in energy density and power density could be made by eliminating the excess active materials in the battery components by making them thinner. A change from powder processing and pellet pressing to processes that can produce thinner components can realize major improvements in battery performance.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

Figure 1A:
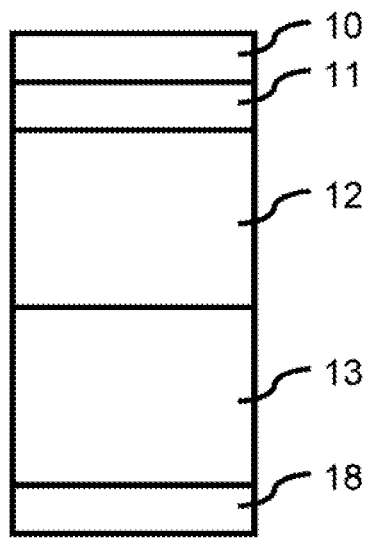
FIG. 1 some embodiments of this invention showing: 1a) a battery cell with an electrode layer comprising an electrode material embedded in the processed polysiloxane resin binder; 1b) a battery cell with one electrode comprising an electrode material embedded in the processed polysiloxane resin binder and a separator comprising separator material embedded in the processed polysiloxane resin binder.

This invention comprises a novel binder and method of fabricating electrode and separator components for batteries, such as thermal batteries, that employ the novel binder. The binder enables fabrication of thin components highly suitable for high power applications. Electrode and/or separator materials are embedded in the processed polysiloxane resin which serves as a binder in embodiments of this invention. The processed polysiloxane resin is a partially oxidized resin of a polysiloxane formed by reaction of a mixture comprising methyl trichlorosilane, dimethyl dichlorosilane, and a short chain alcohol. The processed polysiloxane resin is formed by crosslinking at a relatively low temperature followed by partial oxidation at a higher temperature. The partial oxidation leaves substantial concentrations of methyl groups in the processed polysiloxane resins of various embodiments of this invention. The processed polysiloxane is thermally stable in non-oxidizing environments.

Various embodiments of the present invention provides the following advantages:
a) Improved power density and energy density from conformal ultra-thin electrodes that are bonded to their current collectors and conformal ultra-thin separators that are bonded to the electrodes.
b) Production cost reduction by elimination of labor-intensive, pellet processing. Instead, any or all components (anode, cathode and separator) can be fabricated using single-layer or multi-layer casting technologies. Bonded, monolithic electrodes replace sequential, stepwise stacking of separate current collector, anode, separator, and cathode pellets. Processing and assembly can be automated using casting technology.
c) Application-defined form-factors by eliminating the requirement of right-circular-cylinder pellet-press-defined components. Densities and thicknesses of components have been dictated in the past by pellet technology. In some embodiments of this invention, components can be punched or cut from prefabricated sheets to desired dimensions and shapes. Large surface area electrodes are not limited by the availability of costly (and slow) high-tonnage press equipment.
d) Reduction in the lot-to-lot variation during production. In current pellet technology, the molten salt serves as the electrolyte and as the binder for the separator. The salt is a good electrolyte but not a very good binder. In current pellet-based technology, cohesion of the cathode and separator is achieved by the capillary force of the molten salt in the oxide and/or sulfide matrix. Consequently, cohesion is sensitive to: a) electrolyte formulation, b) impurities in the electrolyte, such as oxides and hydroxides, which affect surface tension, c) changes in surface area and surface free energy of the separator and cathode powders (both vary with supplier and fabrication processes), and d) changes in particle size and particle size distribution which change the pore radii and control the capillary forces. The variability of these factors can require retesting of components. Such rework is reduced by using the molten salt as the electrolyte only, and by using a binder that is substantially insensitive to these properties, as is made clear in descriptions of embodiments of this invention.
e) Improved structural integrity for high g-force applications. When thermal batteries are activated, a >15% dimensional relaxation of separator pellets can occur under high closing force. Extremely high g-forces can contribute to stack distortion and short circuits as separators may collapse. This lack of integrity results from the relatively poor and frequently irreproducible binding characteristics, which rely upon the capillary forces of molten salts in porous matrices. Embodiments of the present invention utilize thermally and electrochemically stable bonding agents to form very robust monolithic components (cathode, separator and/or anode) which can withstand high g-forces. The bonded structures of various embodiments also withstand high thermal shock. Collapse and plastic flow of the components in embodiments of this invention is greatly reduced compared to the pellet components.

Figure 1B:
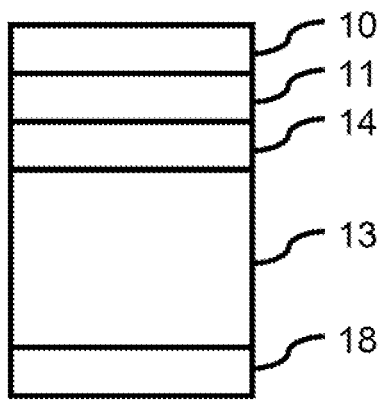

FIG. 1 illustrates some embodiments of this invention. In each section of FIG. 1, one cell of a battery that may comprise multiple cells stacked in a bipolar configuration is illustrated. In some embodiments of this invention, multiple cells may be arranged in series to increase the voltage or in parallel to increase the current for a particular application, as is commonly done. FIG. 1a illustrates a battery embodiment wherein one electrode comprises electrode material embedded in the processed polysiloxane resin binder of the present invention. A current collector 10 is in electrical contact with an electrode layer 11. The electrode layer 11 comprises an electrode material intermixed with a processed polysiloxane resin binder material. In the embodiment illustrated in FIG. 1a also illustrates the presence of a separator layer 12 adjacent to the electrode layer 11 and an electrode layer of opposite polarity 13 adjacent to the separator layer. The electrode layer 13 is in electrical contact with a current collector 18. One or more of the layers 11, 12, and 13 may be prepared using the processed polysiloxane resin binder of the present invention or by previously known methods. For example, in thermal battery embodiments, one or more of the separator layer 12 and electrode layers 11 and 13 could be prepared using a conventional pressed-pellet technique. FIG. 1b illustrates a battery embodiment wherein the electrode layer 11 is a cathode layer that comprises a layer of a cathode material embedded in the processed polysiloxane resin binder. The separator layer 14 comprises a separator material and the processed polysiloxane resin binder. The slurry method of preparing the various layers comprising the processed polysiloxane resin binder enables the formation of relative thin layers compared to pressed-pellet techniques. The second electrode layer 13 is an anode prepared by conventional methods. For example, in thermal battery embodiments, the anode layer 13 could be prepared using a conventional pressed-pellet technique. Multiple cells can be combined to form a layer stack. In each case, the layer stack is terminated with a second current collector 18. In embodiments where multiple cells are stacked in a bipolar arrangement in a series configuration, the first 10 and second 18 collectors will be at opposing ends of the cell stack.

Figure 2:
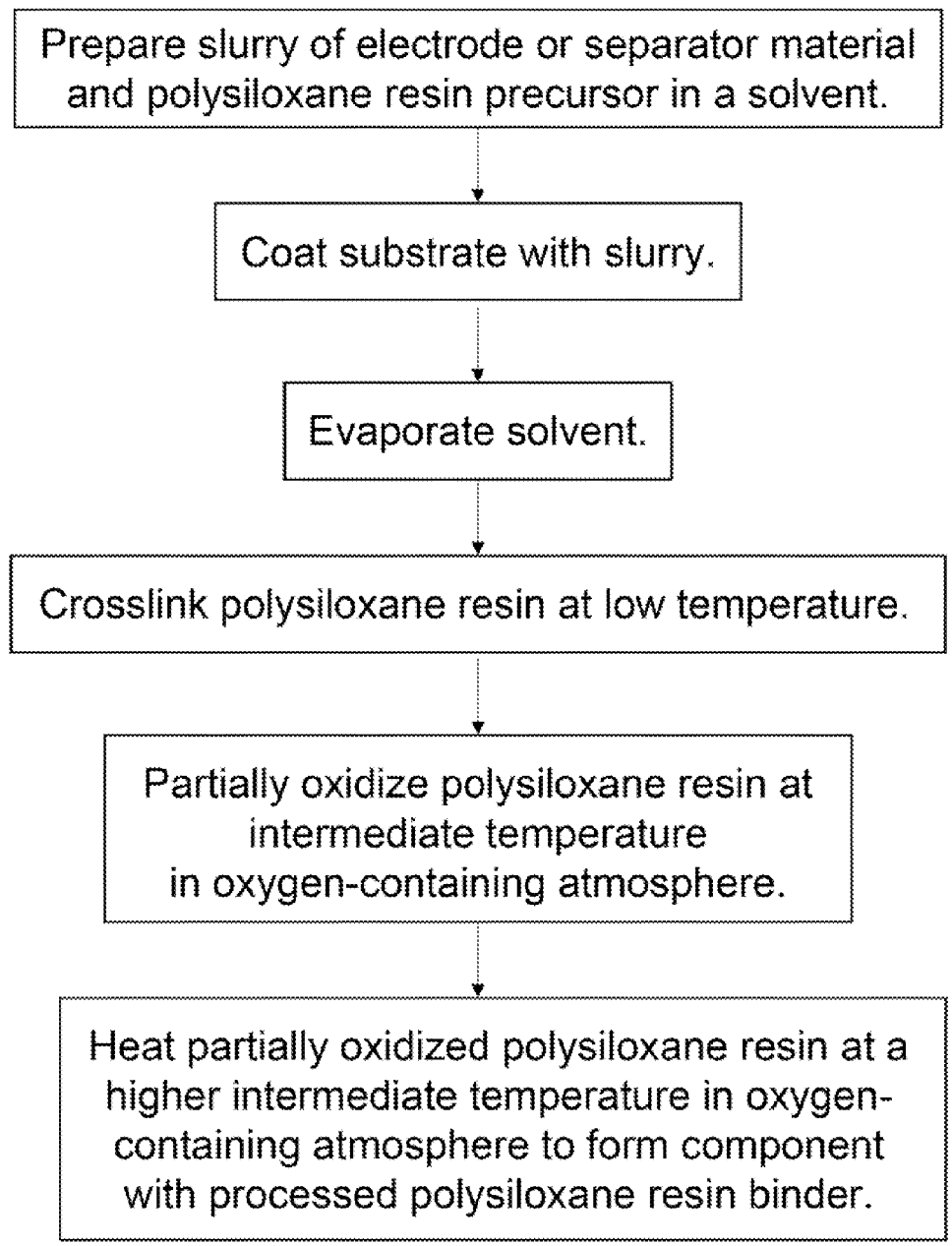
FIG. 2 presents a flowchart schematically illustrating one embodiment of the method of this invention.

FIG. 2 illustrates a flow chart for one embodiment of the method of fabricating the battery component structures of the present invention.

In embodiments of this invention, the binders which enable the preceding improvements are derived from methyl trichlorosilane and dimethyl dichlorosilane. The polysiloxane resin precursor comprises these monomers in a short-chain alcohol (ethanol in some embodiments) and reacted to produce a polysiloxane resin in which each silicon atom is bonded to either two or three other silicon atoms through an oxygen bridge and either two or one methyl group respectively. Other short-chain alcohols with four or fewer carbon atoms may be employed. Furthermore, the resin contains a small fraction (typically less than a few percent) of ethoxy and hydroxy functionality residual from the crosslinking reaction. FIG. 2 presents a flowchart schematically illustrating one embodiment of the method of this invention. The resin is dissolved in a solvent (typically toluene or xylene or a mixture thereof). Other solvents and solvent combinations may be employed provided they can solubilizing the resin. The resin solution is blended with the anode, cathode, or separator constituent materials to form anode, cathode, or separator slurries. In some embodiments, the constituent materials are in a powder form. A variety of granular, microparticulate, and/or nanoparticulate forms of the constituent solids may be used in various embodiments if suitable for forming a slurry in the selected solvents. The corresponding slurry is coated onto a current collector (or in the case of the separator, it is coated onto the cathode or anode) using coating, painting or printing techniques. The anode, cathode, and separator are termed battery subcomponents. Their constituent materials are termed batter subcomponent materials. The coated electrode or separator is heated (typically between approximately 60° C. and 160° C. but a lower temperature may be employed depending in part upon the solvent employed) to remove the solvent and further heated (typically between 190° C. and 220° C. in an oxygen-containing atmosphere) to further crosslink the polysiloxane resin. This is termed low-temperature crosslinking. The coating is then heated to between approximately 240° C. and 290° C. in an oxygen-containing atmosphere to oxidize the polysiloxane resin and increase the surface energy of the electrode so that it will wet the molten electrolyte when the thermal battery is activated. Optionally, the oxygen-containing atmosphere can be air. This is termed higher-temperature partial oxidation. In some embodiments, when an electrode with an oxidizable material such as $FeS_2$ is coated, the oxidation of the polysiloxane resin that serves as the binder may be performed at the lower end of the temperature range (for example, between approximately 240° C. and 250° C.) to prevent the simultaneous oxidation of the oxidizable material. In embodiments were unwanted oxidation is a concern, the electrode is heated for a short time, for example for between approximately 1 and approximately 4 hours at between approximately 240° C. and approximately 250° C. in an oxygen-containing atmosphere air to complete the oxidation of the polysiloxane resin, and is further heated for between approximately 4 and approximately 16 hours at between approximately 240° C. and approximately 250° C. in a substantially oxygen-free atmosphere to increase the surface energy of the electrode. Variations in these times and temperatures may be used, such as somewhat lower temperatures for correspondingly longer times or somewhat higher temperatures for correspondingly shorter times. The preceding are convenient time/temperature combinations for achieving the desired material transformations. Inert gases, including but not restricted to Ar, can provide a suitable processing substantially oxygen-free atmosphere; other atmospheres employed for oxygen-sensitive reactions may also be employed in embodiments of this invention. Optionally, if the electrode material is very sensitive to oxidation at the low temperature range of 240° to 250° C., the crosslinking reaction performed between approximately 190° C. and approximately 220° C. and the subsequent oxidation at temperatures between approximately 240° C. and approximately 250° C. can be conducted in the presence of water vapor. The water vapor serves to inhibit excessive oxidation of the electrode material.

In embodiments where oxidation of a constituent is not a concern, such as when a separator comprising oxidation-resistant materials such as, for example, BN, an inert oxide such as MgO, $Al_2O_3$, $SiO_2$, or another inert powder, is coated, the polysiloxane resin may be oxidized at higher temperatures, such as, for example, approximately 290° C. Variation in the chosen oxidation temperature may be employed, depending on the particular polysiloxane resin being employed in a given embodiment. The combination of lower-temperature crosslinking followed by higher-temperature oxidation of the polysiloxane resin in an oxidizing atmosphere (which forms a material termed processed polysiloxane in the following discussion) causes a significant loss of the methyl groups on the polysiloxane backbone so that when the processed polysiloxane is subsequently heated up to 550° C. in the absence of oxygen, negligible (less than approximately 2 percent) loss of weight is observed. Such low weight loss is deemed thermally stable. The processed polysiloxane is, therefore, thermally stable to 550° C. in a non-oxidizing atmosphere. If the processed polysiloxane is heated to 550° C. in an oxidizing atmosphere, such as air, a significant weight loss is observed, and $SiO_2$ is formed as the product. The oxidation temperatures between approximately 240° C. and approximately 290° C. do not completely remove all of the methyl groups. The processed polysiloxane, which still contains some methyl groups, does not dissolve in the molten thermal battery electrolyte in the time period of the discharge. Similarly, in the time period of the discharge of the battery, it is not oxidized by the cathode material, such as $FeS_2$ in some embodiments, and it is not significantly reduced by the anode material, such as Mg metal in some embodiments. The processed polysiloxane is the binder for at least one of the anode, cathode, and separator in embodiments of the present invention.

For some embodiments, the polysiloxane resin which was processed to yield the binder of some embodiments of the present invention was a product of Wacker Chemie AG. Wacker Chemie produces many polysiloxane resins (silicone resins) with substantially similar properties. These resins differ primarily in the relative amounts of methyltrichlorosilane and dimethyldichlorosilane used in the preparation of the polysiloxane. For some thermal battery embodiments, a resin with the characteristics of the Wacker Chemie AG resin designated Silres KX performs well. Other polysiloxane resins with substantially similar chemical properties are also expected to perform satisfactorily in various embodiments of this invention. Polysiloxane resins with similar properties are available from a variety of manufacturers, for example, from Dow Corning. While the following demonstrated embodiments employed Silres KX, it is to be expected that polysiloxane resins from such other manufactures will also be suitable for various embodiments of this invention.

Figure 3:
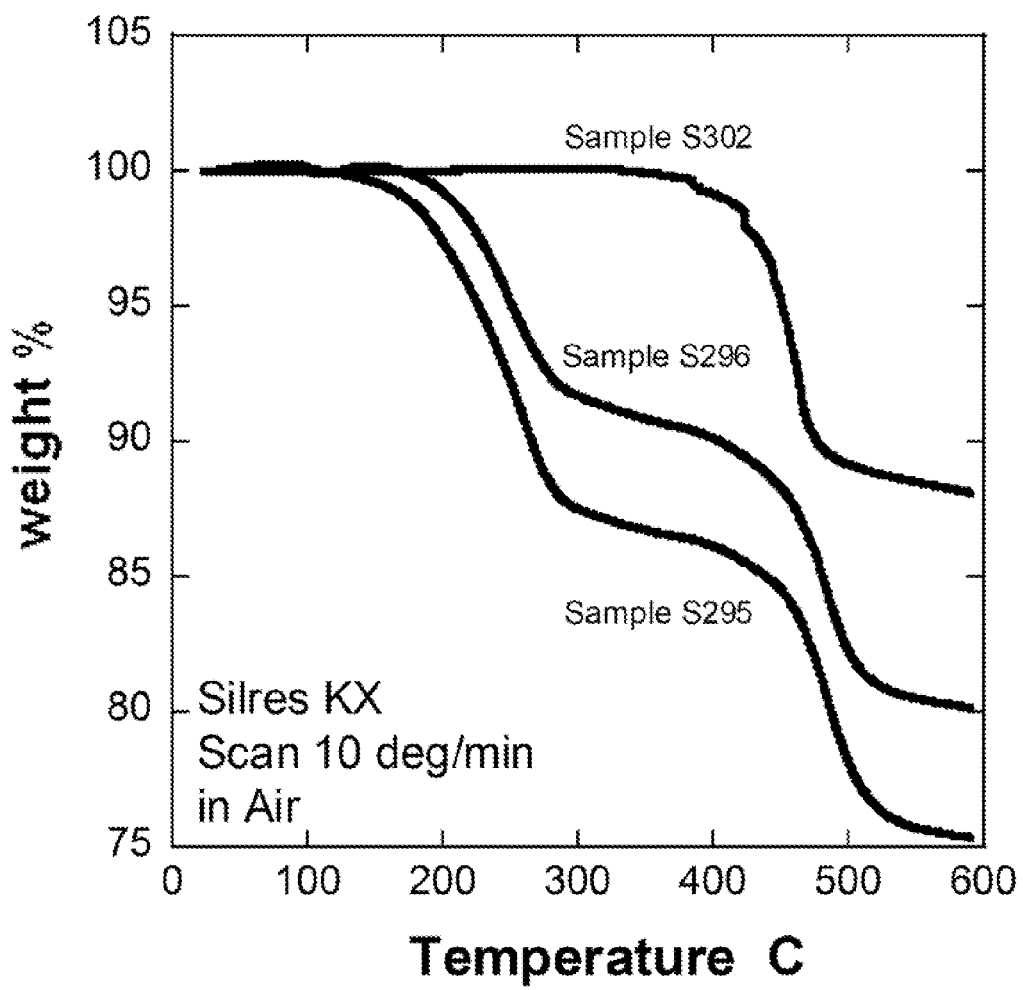
FIG. 3 illustrates a Thermogravimetric Analysis (TGA) for Silres KX in air. All samples were heated at 150° C. for 2 hours to remove xylene solvent prior to analysis. Control sample S295 was without thermal processing. Sample S296 was processed in air at 200° C. for one hour. Sample S302 was processed in air at 250° C. for four hours.
Figure 4:
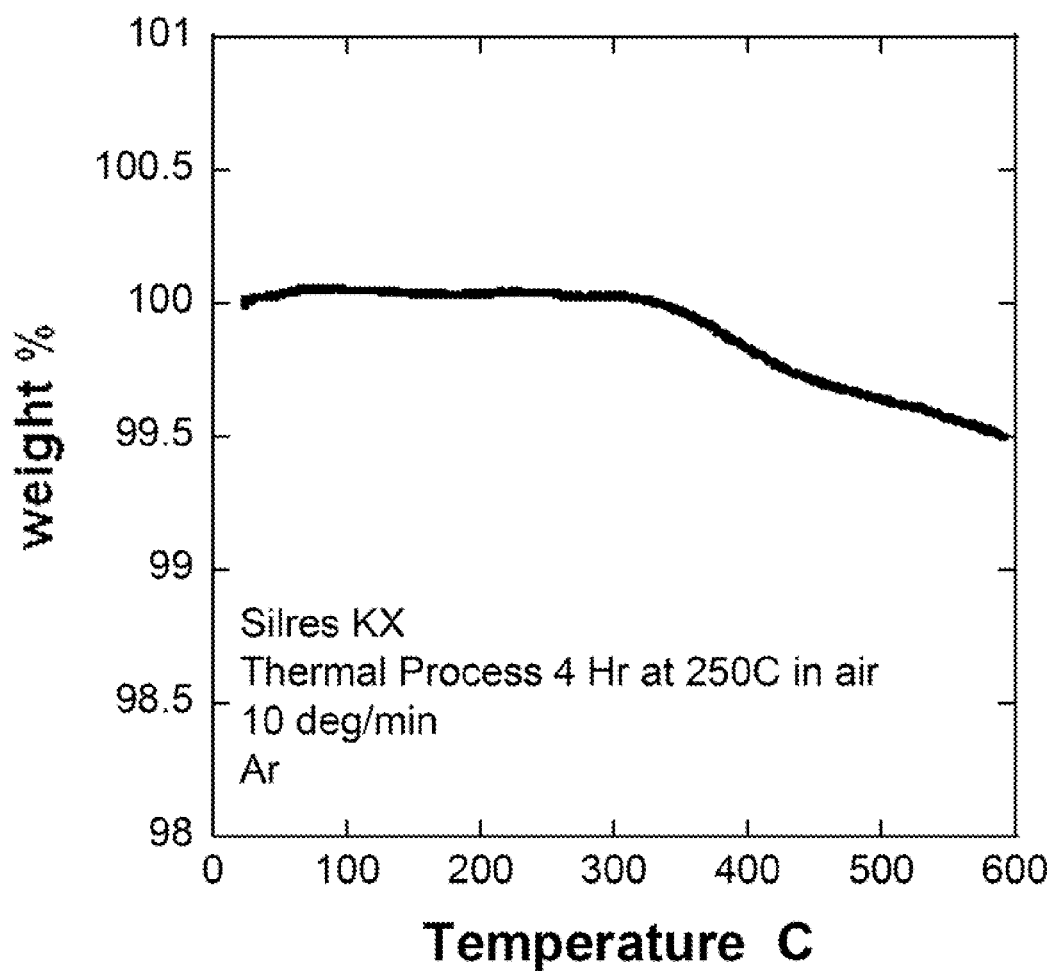
FIG. 4 illustrates a TGA for Silres KX in argon after thermal processing at 250° C. in air for four hours.

FIG. 3 presents the thermogravimetric analysis (TGA) data for Silres KX in air without additional processing (sample S295). This figure also shows the TGA of Silres KX in air after prior processing in air for 1 hour at 200° C. (sample S296) and 4 hours at 250° C. (sample S302). After processing at 250° C. for 4 hours, KX still retains considerable methyl groups on the backbone which are thermally oxidized at >~400° C. (see second stage weight loss starting at ~400° C. to total weight loss of 12% at 600° C.) After this processing protocol at 250° C., however, the retained methyl groups are very stable against thermal decomposition in the absence of air. FIG. 4 shows the TGA of Silres KX sample S302 from FIG. 3, except the TGA is measured in argon not air. This sample looses <0.5 wt % at 600° C. in the absence of air.

Figure 5:
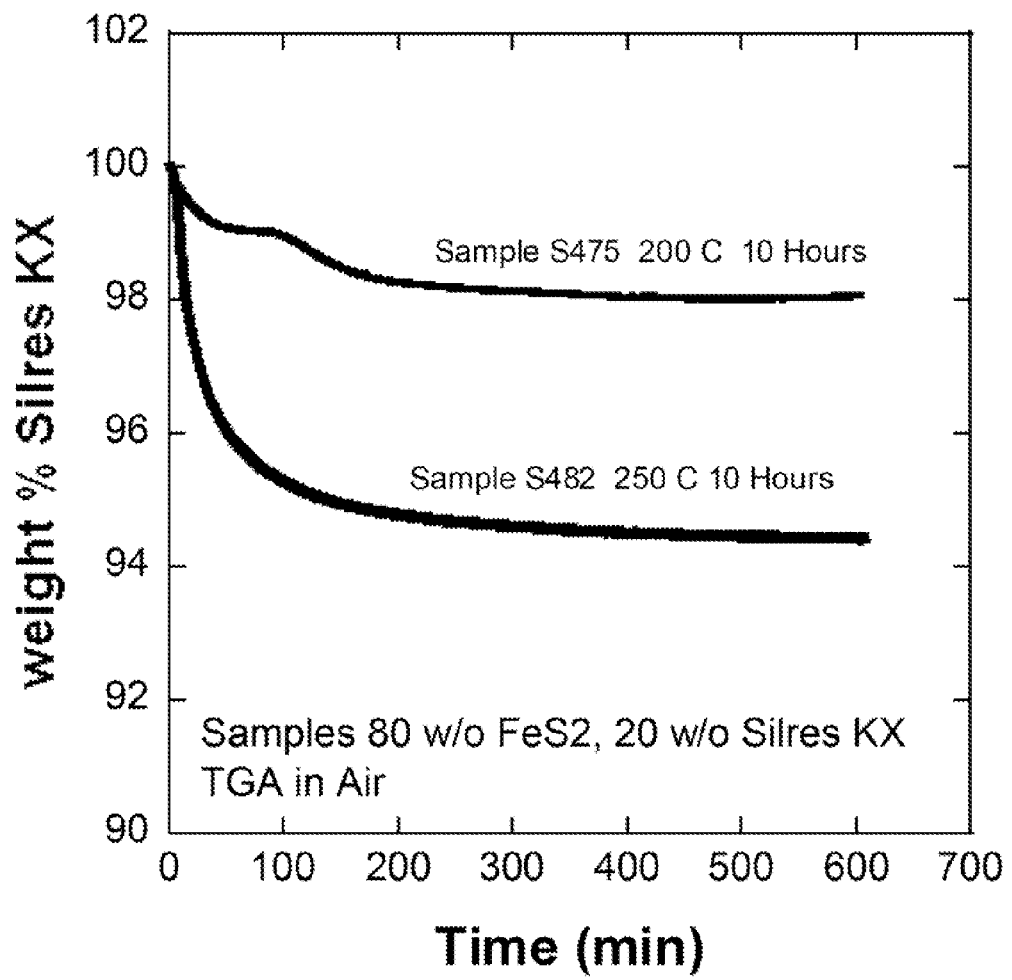
FIG. 5 illustrates a TGA for Silres KX and FeS$_2$ at 200° C. and 250° C.
Figure 6:
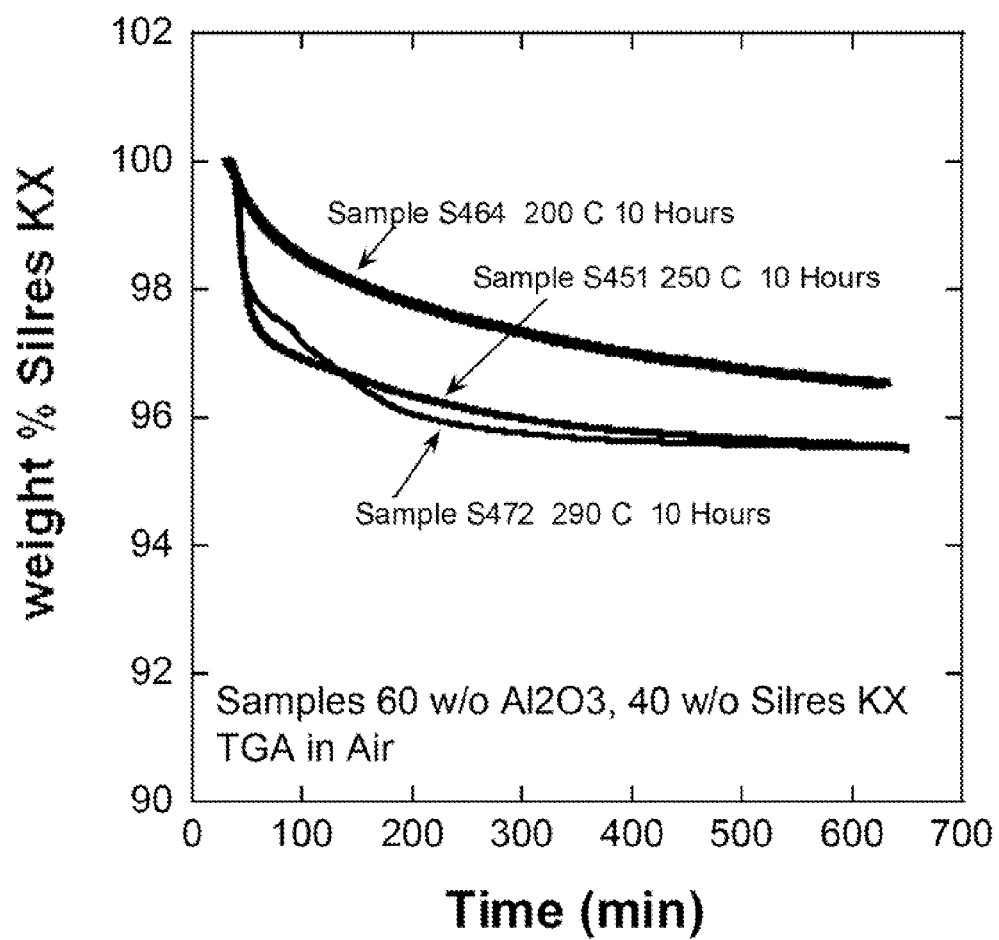
FIG. 6 illustrates a TGA for Silres KX and aluminum oxide at 200° C., 250° C. and 290° C.
Figure 7:
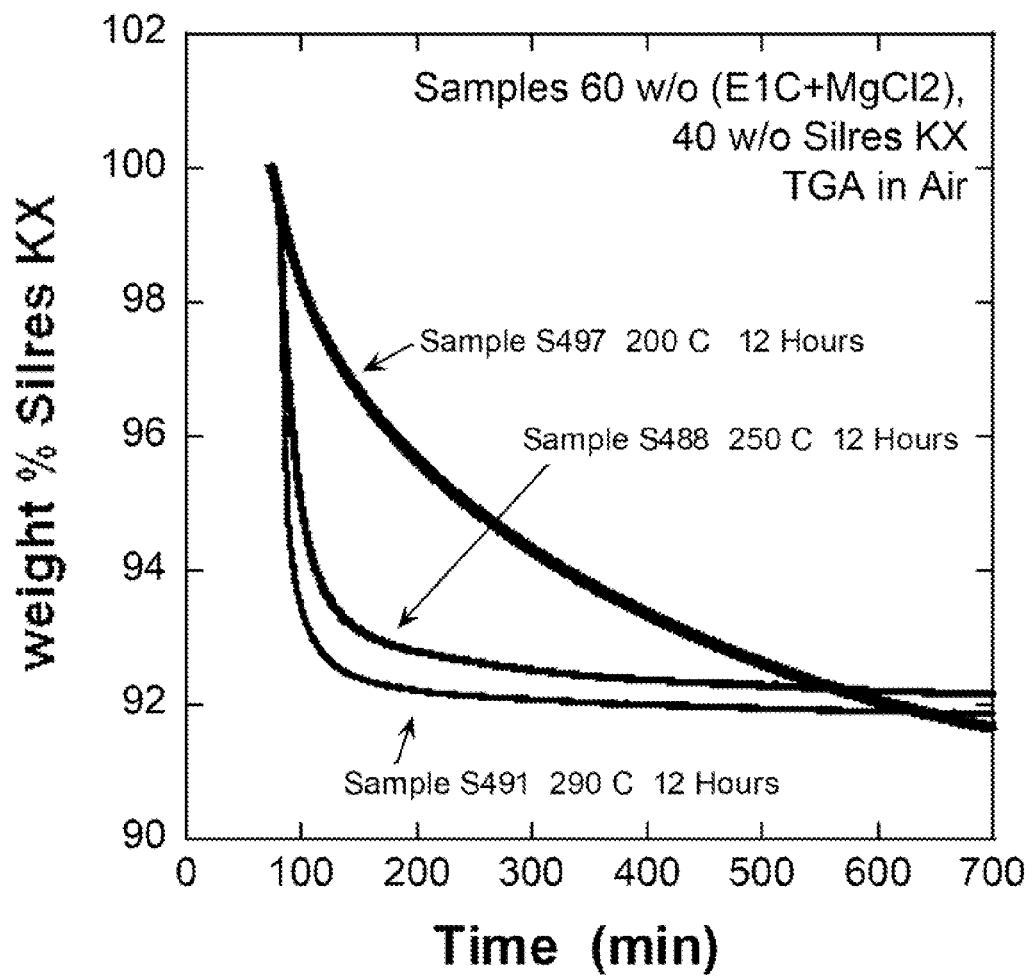
FIG. 7 illustrates a TGA for Silres KX and electrolyte salt consisting of E1C (eutectic mixture of LiCl and KCl) and 5% MgCl2 at 200° C., 250° C. and 290°

FIG. 5 presents the TGA for Silres KX in the presence of $FeS_2$ after processing in air for 10 hours at either 200° C. (sample 5475) or 250° C. (sample S482). FIG. 6 presents the TGA for Silres KX in the presence of $Al_2O_3$. Processing in air was conducted for 10 hours at 200° C. (sample S464), 250° C. (sample S451), and 290° C. (sample S472), respectively. The samples were 60 wt % $Al_2O_3$, 40 wt % Silres KX. In these embodiments, $Al_2O_3$ is used in the battery separator to contain the molten salt electrolyte. FIG. 7 presents the TGA for Silres KX in the presence of E1C+$MgCl_2$. The samples were 40 wt % Silres KX and 60 wt % (E1C+$MgCl_2$). The (E1C+

$MgCl_2$) is the molten salt electrolyte (E1C is the eutectic mixture of LiCl and KCl). Approximately 5% $MgCl_2$ is typically added to this mixture to lower the surface tension of the molten salt to wet the Al2O3 surface, but higher $MgCl_2$ concentrations up to approximately 10% may be employed. Other halide salts or mixtures of halide salts which satisfy the electrical requirements of the thermal battery may be used as long as they melt above the maximum temperature which is used to process the polysiloxane resin. In various embodiments, some variation in processing times and temperatures may be desirable due to the interaction of the individual constituents of the anode, cathode, and/or separator with their differing relative concentrations with the polysiloxane.

Figure 8:
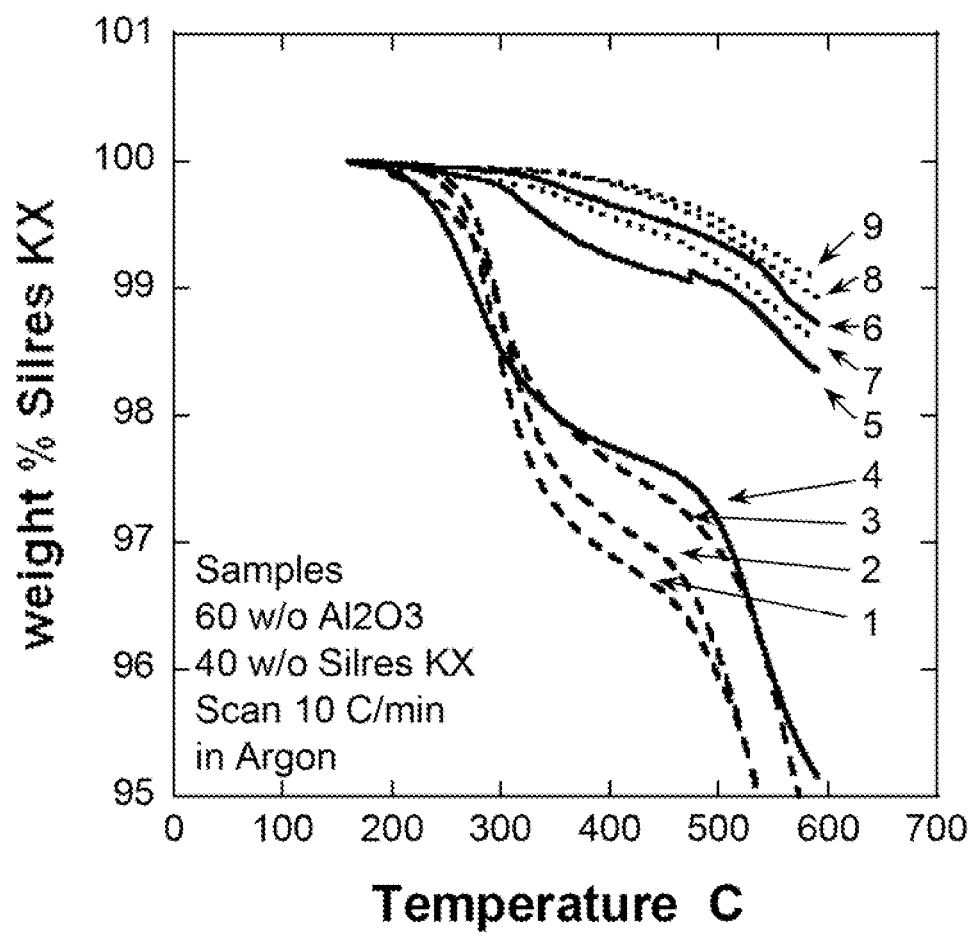
FIG. 8 illustrates a TGA in Argon for Silres KX and aluminum oxide after thermal processing: Sample 1 for 1 hour at 200° C.; Sample 2 for 2 hours at 200° C.; Sample 3 for 4 hours at 200° C.; Sample 4 for 1 hour at 250° C.; Sample 5 for 4 hours at 250° C.; Sample 6 for 8 hours at 250° C.; Sample 7 for 1 hour at 290° C.; Sample 8 for 2 hours at 290° C.; Sample 9 for 4 hours at 290° C.

FIG. 8 shows that the processed polysiloxane resin derived from Silres KX is thermally stable in argon to 550° C. (will liberate <~1% gas) if it is thermally processed in air for 8 hours at 250° C. or 2 hours at 290° C. The treatments for the various samples presented in FIG. 8 are as follows. Samples 1, 2, and 3 were heated at 200° C. for 1, 2, and 4 hours, respectively. Samples 4, 5, and 6 were heated at 250° C. for 1, 4, and 8 hours, respectively. Samples 7, 8, and 9 were heated at 290° C. for 1, 2, and 4 hours, respectively.

Figure 9:
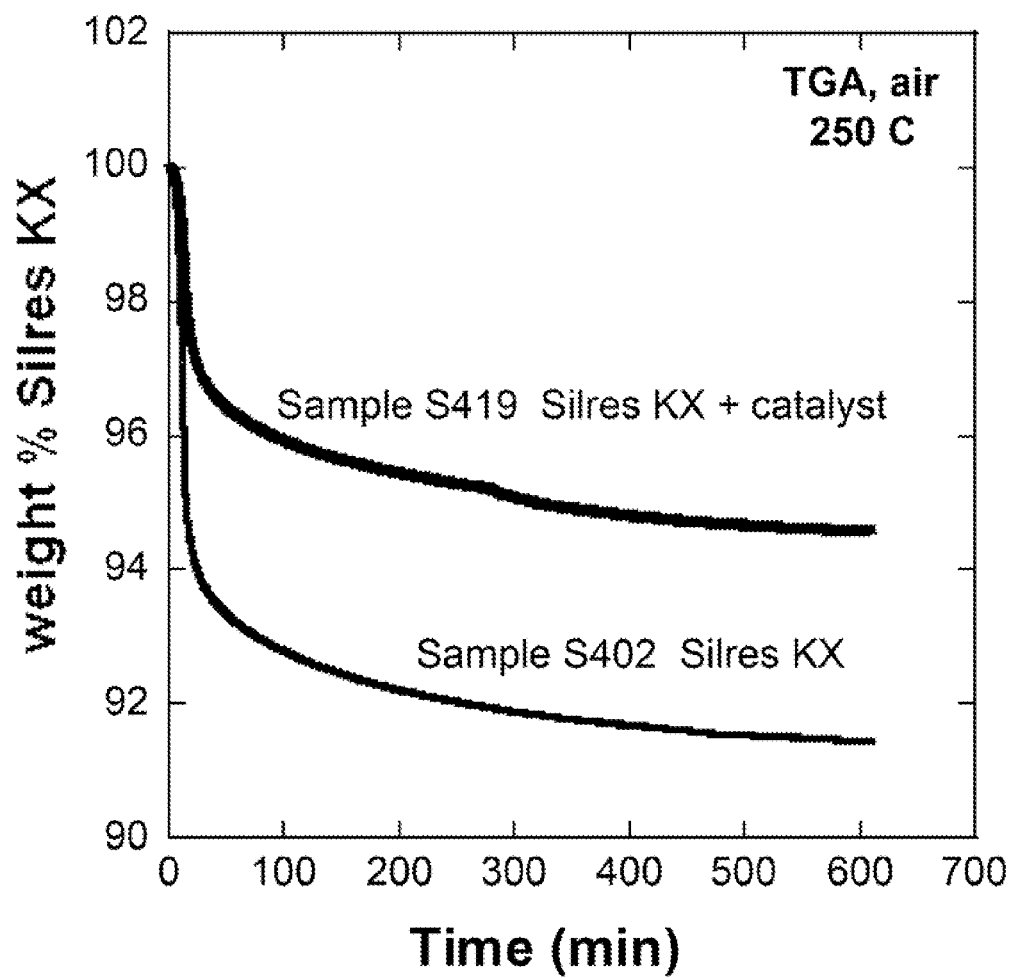
FIG. 9 illustrates a TGA of Silres KX with approximately 1% tin catalyst at 250° C.
Figure 10:
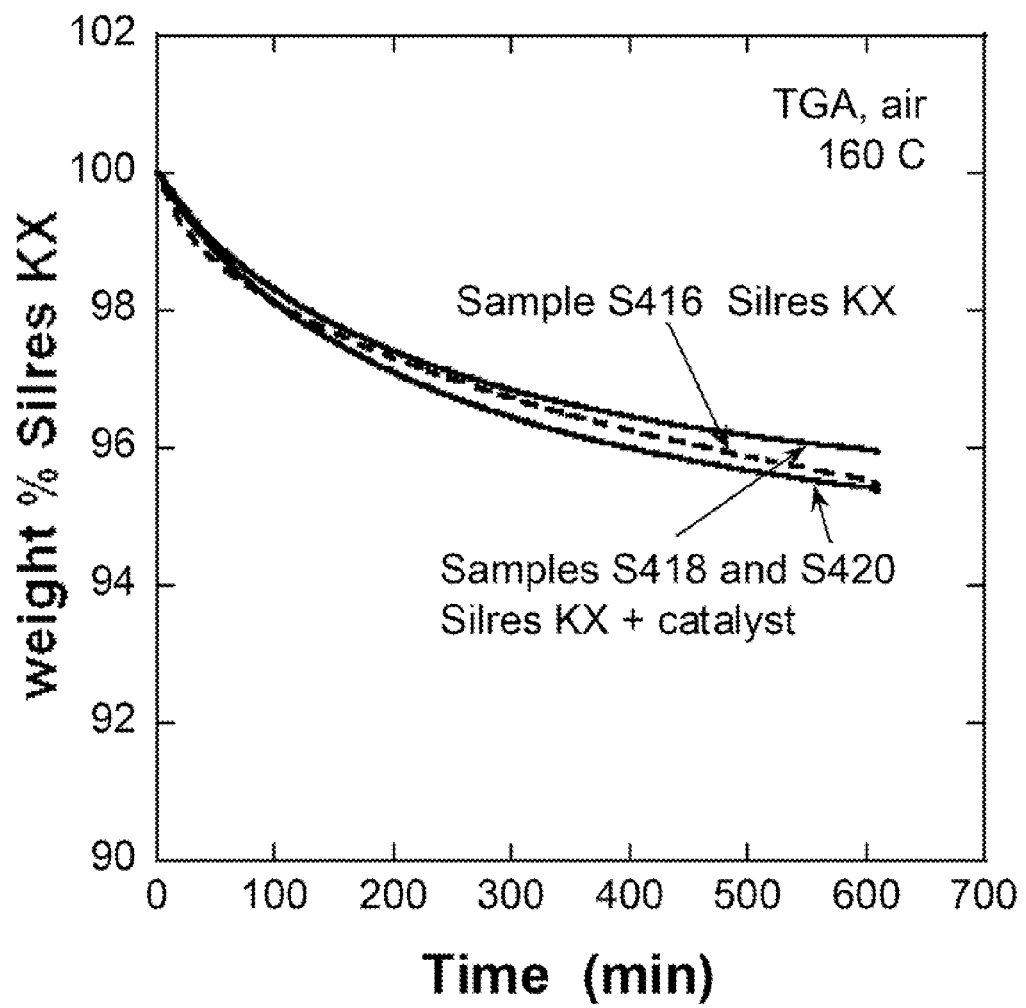
FIG. 10 illustrates a TGA for Silres KX with approximately 1% tin catalyst at 160° C.

FIG. 9 illustrates how a tin catalyst (dibutyl bis[(1-oxo dodecyl) oxy] stannane, $C_{32}H_{64}O_4Sn$, also know as di-n-butyl dilauryl tin) can alter the crosslinking and oxidation reactions for Silres KX when processed at 250° C. in air. Sample 419 contained the catalyst; Sample S402 did not. FIG. 10 illustrates how the same catalyst does not substantially alter crosslinking and/or oxidation for Silres KX processed in air at 160° C.

Some details of some embodiments are described below. These are exemplary and the present invention is not limited to the example embodiments presented below. The following embodiments are described in terms of using the Silres KX polysiloxane, but other similar polysiloxanes, as described above, can also be employed in embodiments of this invention. The processing times and temperatures are employed to perform various functions such as solvent removal, crosslinking reactions, and oxidation. Variations in processing times and temperatures from the specific values listed below that produce substantially similar curing of the polymer to the desired final state are intended to be within the scope of this invention.

Formulation of Thermal Battery Cathode: Example 1. This embodiment uses approximately 66 wt % $FeS_2$ (325 mesh), 29 wt % Electrolyte (E1C+5% $MgCl_2$), and 5 wt % Silres KX (dry weight after thermal processing). Dry film composition ranges between approximately 60% and approximately 80% $FeS_2$, approximately 15% and approximately 40% Electrolyte, and approximately 2% and approximately 10% Silres KX may be used. In this embodiment, 22 g Electrolyte E1C+5% $MgCl_2$+9.5 g solution of Silres KX in xylene (solution is approximately 50% Silres KX and 50% xylene)+0.5 g catalyst solution (10% di-n-butyl dilauryl tin in xylene) are combined. The materials are blended using a shaker/mixer for approximately 2 Hrs with 3 mm alumina beads. Other times may be employed provided they produce a well-mixed suspension. To the suspension is added 50 g $FeS_2$+7.8 g Xylene for shaking/mixing for approximately 10 minutes (other times that provide sufficient mixing may also be employed). A wet film of approximately 8-mil thickness is coated onto a substrate, such as, for example, a stainless steel sheet. Other film thicknesses may be employed. The material is air-dried to remove most of the solvent and then heated to remove the remainder of the solvent. For example, 10 minutes of air drying can be followed by approximately 30 min. at approximately 160° C. The sample is then heated for 2 hours at approximately 200° C. in air. Optionally, a water source is provided within the heating chamber to inhibit excessive oxidation of the $FeS_2$. In some embodiments, temperatures between approximately 190° C. and approximately 220° C. may be employed for treatment times between approximately 1 and approximately 10 hours. Variations in times and temperatures that achieve substantially the same degree of crosslinking and oxidation may also be used. The sample is then heated for 2 hours at approximately 250° C. in air. Optionally, a water source is provided within the heating chamber to inhibit oxidation of the $FeS_2$. In some embodiments, temperatures between approximately 240° C. and approximately 250° C. may be employed for treatment times between approximately 1 and approximately 4 hours. Variations in times and temperatures that achieve substantially the same degree of crosslinking and oxidation may also be used. Then the cathode was heated a 250° C. in argon for 16 hours. In some embodiments, temperatures between approximately 240° C. and 250° C. may be employed for treatment times between approximately 4 to 20 hours. The final treatment in a non-oxidizing atmosphere increases the surface energy of the cathode which allows the molten electrolyte to better wet the cathode when the thermal battery is activated. Activation is by heating to melt the solid electrolyte.

Formulation of Thermal battery Separator: Example 2. This embodiment uses approximately 65 wt % Electrolyte (E1C+5% $MgCl_2$)), approximately 30 wt % $Al_2O_3$, and 5 wt % Silres KX (dry weight after thermal processing). Dry film composition ranges between approximately 25% and approximately 30% $Al_2O_3$, approximately 60% and approximately 70% Electrolyte, and approximately 5% and approximately 10% Silres KX can be used. In this embodiment, 70 g Electrolyte E1C+5% $MgCl_2$+13.5 g solution of Silres KX in xylene (solution is approximately 50% Silres KX and 50% xylene)+0.6 g catalyst solution (10% di-n-butyl dilauryl tin in xylene) are combined. The materials are blended using a shaker/mixer for approximately 2 hours with 3 mm alumina beads. Other times may be employed provided they produce a well-mixed suspension. To the suspension is added 32.3 g $Al_2O_3$+7.3 g Xylene blend for shaking/mixing for approximately 10 minutes (other times that provide sufficient mixing may also be employed). A wet film of approximately 10-mil thickness is coated onto a substrate, such as, for example, a magnesium foil anode. Other film thicknesses can be employed. The material is air-dried to remove most of the solvent and then heated to remove the remainder of the solvent. For example, 10 minutes of air drying can be followed by approximately 30 min. at approximately 160° C. The sample is then heated for 2 hours at approximately 200° C. in air. In some embodiments, temperatures between approximately 190° C. and approximately 220° C. may be employed for treatment times between approximately 1 and approximately 10 hours. Variations in times and temperatures that achieve substantially the same degree of crosslinking and oxidation may also be used. The sample is then heated for 2 hours at approximately 250° C. in air. In some embodiments, temperatures between approximately 240° C. and approximately 250° C. may be employed for treatment times between approximately 1 hour and approximately 4 hours. Variations in times and temperatures that achieve substantially the same degree of crosslinking and oxidation may also be used. The sample is then heated for 2 hours at approximately 290° C. in air. In some embodiments, temperatures between approximately 280° C. and approximately 320° C. may be employed for treatment times between approximately 1 hour and approximately 10 hours. Variations in times and temperatures that achieve substantially the same increase in surface energy may also be used.

Figure 11:
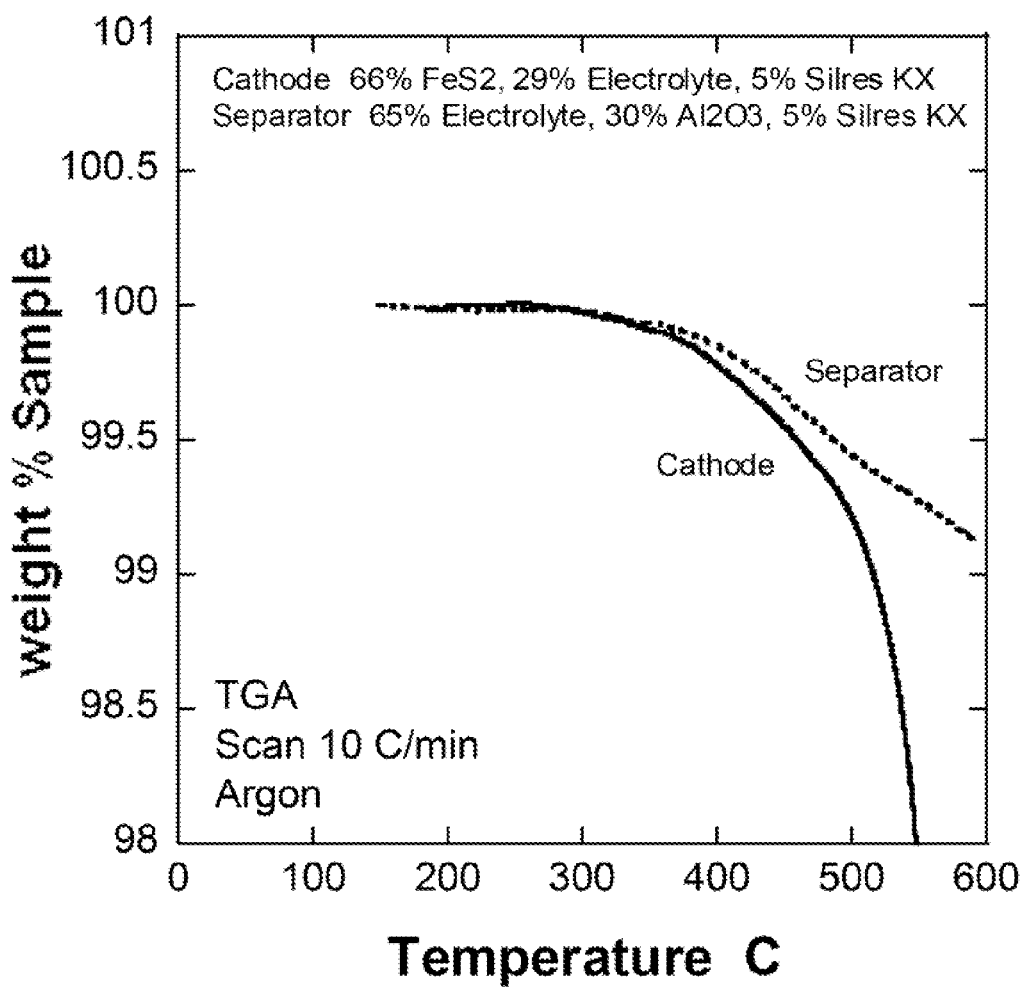
FIG. 11 illustrates a TGA of a cathode and separator made according to formulations described later as Examples 1 and 2, respectively.
Figure 12:
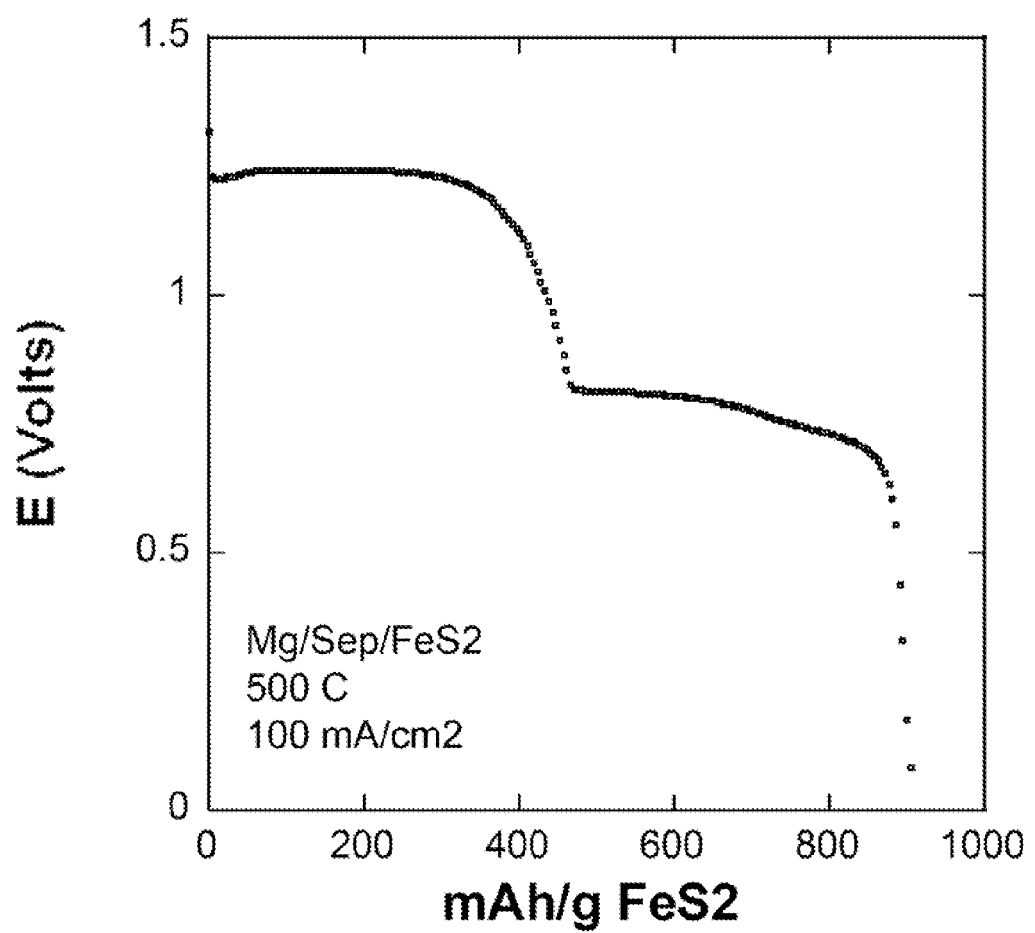
FIG. 12 illustrates the discharge of a thermal battery single cell at 500° C. Cathode and separator compositions and thermal processing are as described later as Examples 1 and 2.

FIG. 11 illustrates the TGA for a cathode and a separator made as described above. FIG. 12 illustrates the discharge of Mg/Separator/FeS$_2$ thermal battery made with this cathode and separator composition described above.

Embodiments of this invention are suitable for use as binders in a wide range of batteries, including but not limited to thermal batteries. Examples include but are not restricted to the following embodiments.

One embodiment comprises a battery component structure comprising a first current collector, an electrode layer comprising an electrode material intermixed with a processed polysiloxane binder material, the electrode layer being in electrical contact with the first current collector and optionally further comprising a separator layer comprising a separator material intermixed with a processed polysiloxane binder material, the separator layer being in contact with a surface of the electrode layer that is not a surface of the electrode layer that is in electrical contact with the first current collector. In various embodiments, the electrode separator material is selected from the group consisting of MgO, CaO, SiO$_2$, Al$_2$O$_3$, ZrO$_2$, HfO$_2$, Ce$_2$O$_3$, Y$_2$O$_3$, ThO$_2$, BN, and combinations thereof. In some embodiments, the separator material may consist of other nonconductive, insoluble, inert powders or mixtures thereof such as kaolin, talc, diatomaceous earth, calcium silicate and aluminum silicate.

In various embodiments, the electrode material is a cathode material selected from the group consisting of metal sulfides, metal oxides, metal phosphates, metal oxyphosphates, polycarbon monofluoride. Examples of electrode materials for various embodiments include but are not restricted to FeS$_2$, CoS$_2$, MoS$_2$, TiS$_2$ or other metal sulfides or mixtures thereof; or MnO$_2$, CuO, AgO, Li$_x$Mn$_2$O$_4$, Li$_x$CoO$_2$, Li$_x$V$_2$O$_5$, Li$_x$V$_6$O$_{13}$, Li$_x$NiO$_2$, mixed oxides of Mn, Ni, Co, and/or V such as Li$_x$Mn$_{0.33}$Ni$_{0.33}$Co$_{0.33}$O$_2$, or other metal oxides or mixtures thereof, (CF)$_n$, or Li$_x$FePO$_4$. The value of x in the Li-containing compounds varies with the degree of discharge of a battery, as known to those of skill in the Li-battery arts.

In some embodiments, the electrode material may contain conductive additives, including but not restricted to carbon, carbon black, and graphite.

In some embodiments the electrode material is an anode material, including but not restricted to C, Mg, Zn, Li$_4$Ti$_6$O$_{12}$, SnO, SnO$_2$, SiSnO$_3$, Li$_2$SnO$_3$, SnP$_2$O$_7$, LiSn$_2$(PO$_4$)$_3$, Sn$_3$(PO$_4$)$_2$, Sn$_2$(BPO)$_6$ glass, CaSnO$_3$, SrSnO$_3$, BaSnO$_3$, CaSnO$_4$, CaFe$_2$O$_4$, NaFeSnO$_4$, FeBO$_3$, Fe$_3$BO$_6$, MnV$_2$O$_6$, and MnMoO$_4$ and mixtures thereof.

In some embodiments, the electrode material may contain conductive additives, including but not restricted to carbon, carbon black, and graphite.

It is expected that embodiments of this invention are suitable for use as binders in a wide range of electrolytic capacitors, electrochemical capacitors, fuel cells and sensors.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed:

1. A battery component structure comprising:
    a current collector;
    an electrode layer in electrical contact with the current collector, the electrode layer comprising an electrode material embedded in a processed polysiloxane resin, wherein the processed polysiloxane resin is a partially oxidized resin of a polysiloxane formed by reaction of a mixture comprising methyl trichlorosilane, dimethyl dichlorosilane, and a short-chain alcohol.

2. The battery component structure of claim 1, wherein the processed polysiloxane resin is a low-temperature-crosslinked and higher-temperature-partially-oxidized polysiloxane resin that is thermally stable at temperatures less than or equal to approximately 550° C. in a non-oxidizing atmosphere.

3. The battery component structure of claim 1, wherein the electrode layer is a cathode layer.

4. The battery component structure of claim 3, wherein the electrode material is selected from the group consisting of (CF)$_n$, a metal sulfide, FeS$_2$, CoS$_2$, MoS$_2$, TiS$_2$, MnO$_2$, CuO, AgO, Li$_x$Mn$_2$O$_4$, Li$_x$FePO$_4$, Li$_x$CoO$_2$, Li$_x$V$_2$O$_5$, Li$_x$V$_6$O$_{13}$, Li$_x$NiO$_2$, Li$_x$Mn$_{0.33}$Ni$_{0.33}$CO$_{0.33}$O$_2$, and a mixed oxide comprising at least two of the group consisting of Mn, Ni, Co, and V.

5. The battery component structure of claim 1, wherein the electrode layer is an anode layer.

6. The battery component structure of claim 5, wherein the electrode material is selected from the group consisting of C, Mg, Zn, Li$_4$Ti$_5$O$_{12}$, SnO, SnO$_2$, SiSnO$_3$, Li$_2$SnO$_3$, SnP$_2$O$_7$, LiSn$_2$(PO$_4$)$_3$, Sn$_3$(PO$_4$)$_2$, Sn$_2$(BPO)$_6$ glass, CaSnO$_3$, SrSnO$_3$, BaSnO$_3$, CaSnO$_4$, CaFe$_2$O$_4$, NaFeSnO$_4$, FeBO$_3$, Fe$_3$BO$_6$, MnV$_2$O$_6$, MnMoO$_4$, and mixtures thereof.

7. A battery component structure comprising:
    an electrode layer;
    a separator layer adjacent to the electrode layer, the separator layer comprising a separator material embedded in a processed polysiloxane resin, wherein the processed polysiloxane resin is a partially oxidized resin of a polysiloxane formed by reaction of a mixture comprising methyl trichlorosilane, dimethyl dichlorosilane, and a short-chain alcohol.

8. The battery component structure of claim 7, wherein the processed polysiloxane resin is a low-temperature-crosslinked and higher-temperature-partially-oxidized polysiloxane resin that is thermally stable at temperatures less than or equal to 550° C. in a non-oxidizing atmosphere.

9. The battery component structure of claim 7, wherein the separator material is selected from the group consisting of MgO, CaO, SiO$_2$, Al$_2$O$_3$, ZrO$_2$, Ce$_2$O$_3$, Y$_2$O$_3$, ThO$_2$, BN, and combinations thereof.

10. The battery component structure of claim 7, wherein the electrode layer comprises an electrode material embedded in a processed polysiloxane resin, wherein the processed polysiloxane resin is a partially oxidized resin of a polysiloxane formed by reaction of a mixture comprising methyl trichlorosilane, dimethyl dichlorosilane, and a short-chain alcohol.

11. The battery component structure of claim 7, wherein the electrode layer is a cathode layer.

12. The battery component structure of claim 11, wherein the electrode layer comprises an electrode material selected from the group consisting of (CF)$_n$, a metal sulfide, FeS$_2$, CoS$_2$, MoS$_2$, TiS$_2$, MnO$_2$, CuO, AgO, Li$_x$Mn$_2$O$_4$, Li$_x$FePO$_4$, Li$_x$CoO$_2$, Li$_x$V$_2$O$_6$, Li$_x$V$_6$O$_{13}$, Li$_x$NiO$_2$, Li$_x$Mn$_{0.33}$Ni$_{0.33}$Co$_{0.33}$O$_2$, and a mixed oxide comprising at least two of the group consisting of Mn, Ni, Co, and V.

13. The battery component structure of claim 7, wherein the electrode layer is an anode layer.

14. The battery component structure of claim 13, wherein the electrode layer comprises an electrode material selected from the group consisting of C, Mg, Zn, $Li_4Ti_6O_{12}$, SnO, $SnO_2$, $SiSnO_3$, $Li_2SnO_3$, $SnP_2O_7$, $LiSn_2(PO_4)_3$, $Sn_3(PO_4)_2$, $Sn_2(BPO)_6$ glass, $CaSnO_3$, $SrSnO_3$, $BaSnO_3$, $CaSnO_4$, $CaFe_2O_4$, $NaFeSnO_4$, $FeBO_3$, $Fe_3BO_6$, $MnV_2O_6$, $MnMoO_4$, and mixtures thereof.

15. The battery component structure of claim 10, further comprising:
a second electrode layer adjacent to the separator layer.

16. A method for fabricating a battery subcomponent, the method comprising:
preparing a slurry of a polysiloxane resin, a solid electrolyte, and a battery subcomponent material in a solvent, wherein the polysiloxane resin is a product of a reaction of a mixture comprising methyl trichlorosilane, dimethyl dichlorosilane, and a short-chain alcohol;
applying the slurry to the battery subcomponent;
removing the solvent;
heating the battery subcomponent to a temperature suitable for crosslinking the polysiloxane resin;
heating the battery subcomponent for a first heating time in an oxygen-containing atmosphere to a first temperature suitable for partially oxidizing the polysiloxane resin;
heating the battery subcomponent for a second heating time at a second temperature suitable for enabling wetting of the battery subcomponent material by a molten electrolyte derived from the solid electrolyte when the battery subcomponent is heated to at least a melting temperature of the solid electrolyte.

17. The method of claim 16, wherein the step of heating the battery subcomponent for enabling wetting is performed in a non-oxidizing atmosphere.

18. The method of claim 16, wherein the step of heating the battery subcomponent for enabling wetting is performed in an oxidizing atmosphere.

19. The method of claim 16, wherein the step of removing the solvent is performed at a temperature between room temperature and 160° C.

20. The method of claim 16, wherein the battery subcomponent material is selected from the group consisting of MgO, CaO, $SiO_2$, $Al_2O_3$, $ZrO_2$, $HfO_2$, $Ce_2O_3$, $Y_2O_3$, $ThO_2$, BN, C, Mg, Zn, $Li_4Ti_5O_{12}$, SnO, $SnO_2$, $SiSnO_3$, $Li_2SnO_3$, $SnP_2O_7$, $LiSn_2(PO_4)_3$, $Sn_3(PO_4)_2$, $Sn_2(BPO)_6$ glass, $CaSnO_3$, $SrSnO_3$, $BaSnO_3$, $CaSnO_4$, $CaFe_2O_4$, $NaFeSnO_4$, $FeBO_3$, $Fe_3BO_6$, $MnV_2O_6$, $MnMoO_4$, $(CF)_x$, a metal sulfide, $FeS_2$, $CoS_2$, $MoS_2$, $TiS_2$, $MnO_2$, CuO, AgO, $Li_xMn_2O_4$, $Li_xFePO_4$, $Li_xCoO_2$, $Li_xV_2O_5$, $Li_xV_6O_{13}$, $Li_xNiO_2$, $Li_xMn_{0.33}Ni_{0.33}Co_{0.33}O_2$, and a mixed oxide comprising at least two of the group consisting of Mn, Ni, Co, and V.

21. The method of claim 16, wherein the step of heating for the first heating time is performed at the first temperature between 190° C. and 220° C., and wherein the first heating time is between 1 hour and 10 hours.

22. The method of claim 16, wherein the step of heating for the second heating time is performed at the second temperature between 240° C. and 290° C., and wherein the second heating time is between 1 hour and approximately 10 hours.

23. The method of claim 16, wherein the solid electrolyte is a eutectic mixture of LiCl and KCl combined with less than approximately 10% $MgCl_2$.

24. The method of claim 16, wherein the temperature suitable for crosslinking is between 190° C. and 220° C.

* * * * *